United States Patent
Huang

(10) Patent No.: US 12,266,285 B2
(45) Date of Patent: Apr. 1, 2025

(54) DISPLAY PANEL AND DISPLAY APPARATUS HAVING SENSING MODULE

(71) Applicant: BOE Technology Group Co., Ltd., Beijing (CN)

(72) Inventor: Rui Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/294,166

(22) PCT Filed: Dec. 28, 2021

(86) PCT No.: PCT/CN2021/142078
§ 371 (c)(1),
(2) Date: Feb. 1, 2024

(87) PCT Pub. No.: WO2023/122957
PCT Pub. Date: Jul. 6, 2023

(65) Prior Publication Data
US 2024/0346974 A1    Oct. 17, 2024

(51) Int. Cl.
*G09G 3/20* (2006.01)
*G01J 1/04* (2006.01)
(Continued)

(52) U.S. Cl.
CPC .......... *G09G 3/2003* (2013.01); *G01J 1/0488* (2013.01); *G01J 1/4204* (2013.01);
(Continued)

(58) Field of Classification Search
CPC ......... G09G 3/2003; G09G 2320/0242; G09G 2360/144; G01J 1/0488; G01J 1/4204; G01J 1/4228; G01J 1/46; G01J 2001/4473
See application file for complete search history.

(56) References Cited

U.S. PATENT DOCUMENTS

| | | | |
|---|---|---|---|
| 8,570,468 B2 | 10/2013 | Moon et al. | |
| 2008/0002073 A1* | 1/2008 | Hwan Moon | G02F 1/133512 349/38 |

(Continued)

FOREIGN PATENT DOCUMENTS

| | | | |
|---|---|---|---|
| CN | 102402347 A | | 4/2012 |
| CN | 102564581 B | * | 11/2013 |

(Continued)

OTHER PUBLICATIONS

International Search Report and Written Opinion mailed on Sep. 28, 2022, in corresponding PCT/CN2021/142078, 17 pages.

*Primary Examiner* — David D Davis
(74) *Attorney, Agent, or Firm* — XSENSUS LLP

(57) ABSTRACT

Provided are a display panel and a display apparatus; the display panel comprises at least one sensing module (100) arranged in a peripheral area (B), the sensing module (100) comprises at least one sensing unit, the sensing unit (101, 102, 103) comprises a sensing transistor, a first end of the sensing transistor receives an electrical signal, a gate of the sensing transistor receives a first control signal, and a second end of the sensing transistor outputs a photosensitive signal. When the sensing transistor receives the first control signal, a gate of the sensing transistor is set to be in a closed state; when the sensing transistor is illuminated, the voltage outputted by a drain electrode of the sensing transistor increases, the voltage change amount is read as the photosensitive signal, and ambient light is identified according to the spectral features of common ambient light in combination with the response results of different wavelengths. On the basis of that functionality, the display color temperature can be optimized and display performance is improved.

18 Claims, 8 Drawing Sheets

(51) Int. Cl.
    *G01J 1/42*           (2006.01)
    *G01J 1/46*           (2006.01)
    *G01J 1/44*           (2006.01)

(52) U.S. Cl.
    CPC .............. *G01J 1/4228* (2013.01); *G01J 1/46* (2013.01); *G01J 2001/4473* (2013.01); *G09G 2320/0242* (2013.01); *G09G 2360/144* (2013.01)

(56) References Cited

U.S. PATENT DOCUMENTS

| | | | |
|---|---|---|---|
| 2011/0024774 A1* | 2/2011 | Tredwell | H01L 31/1896 257/E33.044 |
| 2012/0302003 A1* | 11/2012 | Shieh | H01L 29/66969 257/E21.46 |
| 2019/0065812 A1* | 2/2019 | Xu | G06V 40/1324 |
| 2023/0030379 A1* | 2/2023 | Wang | G09F 9/30 |

FOREIGN PATENT DOCUMENTS

| | | | | |
|---|---|---|---|---|
| CN | 110095184 A | 8/2019 | | |
| CN | 110675837 A | 1/2020 | | |
| CN | 110993667 A | 4/2020 | | |
| CN | 112331141 A | 2/2021 | | |
| CN | 214253696 U | 9/2021 | | |
| CN | 114360365 A | 4/2022 | | |
| KR | 2008-0001769 A | 1/2008 | | |
| TW | 201312518 A | 3/2013 | | |
| WO | WO-2010017088 A1 * | 2/2010 | ........... | C23C 16/401 |
| WO | 2022/078133 A1 | 4/2022 | | |

\* cited by examiner

DISPLAY PANEL AND DISPLAY APPARATUS HAVING SENSING MODULE

CROSS-REFERENCE TO RELATED APPLICATION

The present disclosure is a 35 U.S.C. 371 national phase application of PCT International Application No. PCT/CN2021/142078 filed on Dec. 28, 2021, the entire content of which is incorporated herein by reference.

TECHNICAL FIELD

The present disclosure relates to the field of display technology, and specifically, to a display panel and a display apparatus.

BACKGROUND

Under different ambient lights, even if the display panel is set to the same color temperature, different effects will appear when observed by the human eye, causing problems such as color aberration. In order to improve the viewing experience, the display color temperature needs to be adjusted for different ambient lights.

Currently, preset color temperature values are used, which results in poor real-time adjustment of color temperature and poor accuracy of adjustment.

It should be noted that the information described in the Background section is only used to enhance understanding of the background of the present disclosure, and therefore may include information that does not constitute prior art known to those of ordinary skill in the art.

SUMMARY

The purpose of the present disclosure is to overcome the above-mentioned shortcomings of the relevant art, and to provide a display panel and a display apparatus.

According to an aspect of the present disclosure, a display panel is provided, which includes a display area and a peripheral area outside the display area. The display panel also includes a base substrate and a sensing module. The sensing module is provided on one side of the base substrate and is located on the periphery area. The sensing module includes a sensing unit. The sensing unit includes a sensing transistor. The first terminal of the sensing transistor receives an electrical signal. The control terminal of the sensing transistor receives a first control signal. The sensing transistor is used to receive ambient light and convert the ambient light into an electrical signal, which is output by the second terminal of the sensing transistor.

In an embodiment of the present disclosure, the sensing unit further includes a storage capacitor and a switch transistor. The first terminal of the storage capacitor is connected to the second terminal of the sensing transistor. The second terminal of the storage capacitor is connected to ground. The storage capacitor stores the photosensitive signal output by the second terminal of the photosensitive transistor. The first terminal of the switch transistor is connected to the first terminal of the storage capacitor. The control terminal of the switch transistor receives the second control signal for acquiring the photosensitive signal stored in the storage capacitor.

In an embodiment of the present disclosure, the sensing module includes a plurality of sensing units. The first terminals of the sensing transistors of the plurality of sensing units receive electrical signals. The control terminals of the sensing transistors of the plurality of sensing units sequentially receive the first control signal. The control terminals of the switch transistors of the plurality of sensing units sequentially receive the second control signal for sequentially acquiring the photosensitive signals stored in the plurality of storage capacitors.

In an embodiment of the present disclosure, the sensing module includes a first sensing unit and a second sensing unit. The sensing transistor of the first sensing unit and the sensing transistor of the second sensing unit are top-gate polysilicon transistor with transparent gates.

In an embodiment of the present disclosure, a filter layer is provided on a side of the first sensing unit away from the base substrate. The orthographic projection of the channel region of the sensing transistor of the first sensing unit on the base substrate is located within the orthographic projection of the filter layer on the base substrate. The filter layer is used to transmit monochromatic light.

In an embodiment of the present disclosure, the distance between the edge of the orthographic projection of the filter layer on the base substrate and the edge of the orthographic projection of the channel region of the sensing transistor of the first sensing unit on the base substrate is greater than 3 μm.

In an embodiment of the present disclosure, the sensing module further includes a third sensing unit, and the sensing transistor of the third sensing unit is a bottom-gate metal oxide transistor.

In an embodiment of the present disclosure, the switch transistor is a top-gate transistor with a transparent gate or a bottom-gate transistor. The display panel further includes a plurality of light shielding parts, and the light shielding part is provided on a side of the switch transistor away from the base substrate. The orthographic projection of the channel region of the switch transistor on the base substrate is located within the orthographic projection of the corresponding light shielding part on the base substrate.

In an embodiment of the present disclosure, the distance between the edge of the orthographic projection of the light shielding part on the base substrate and the edge of the orthographic projection of the channel region of the switch transistor on the base substrate is greater than 3 μm.

In an embodiment of the present disclosure, the switch transistor is a top-gate transistor with an opaque gate, and the orthographic projection of the channel region of the switch transistor on the base substrate is located within the orthographic projection of the gate on the base substrate.

In an embodiment of the present disclosure, the switch transistor is an oxide transistor or a polysilicon transistor.

In an embodiment of the present disclosure, the sensing module has a plurality of sensing units, and the sensing transistors of the plurality of sensing units are top-gate polysilicon transistors with transparent gates or bottom-gate polysilicon transistors. The display panel further includes a color filter layer. The color filter layer is located on the side of the filter layer away from the base substrate. The color filter layer includes a plurality of filter parts of different colors. Each filter part corresponds to one of the sensing transistors. The orthographic projection of the channel region of the sensing transistor on the base substrate is located within the orthographic projection of the filter part on the base substrate.

In an embodiment of the present disclosure, the color filter layer further includes a light shielding part. The orthographic projection of the channel region of the switch transistor on the base substrate is located within the orthographic projection of the light shielding part on the base substrate.

In an embodiment of the present disclosure, the distance between two adjacent sensing units is greater than 6 µm; and the distance between the sensing transistor and the switch transistor being adjacent in each sensing unit is greater than 6 µm.

In an embodiment of the present disclosure, the length of the channel region of the sensing transistor along the first direction is greater than the length of the channel region of the sensing transistor along the second direction. The first direction and the second direction are perpendicular to each other. The first direction is the width direction of the sensing transistor, and the second direction is the length direction of the sensing transistor.

In an embodiment of the present disclosure, the sensing module is provided in plural, and the plurality of sensing modules is evenly arranged in the peripheral area along the outline of the display panel.

According to another aspect of the present disclosure, a display apparatus is provided, including the display panel according to an aspect of the present disclosure.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure. It is noted that the drawings in the following description are only some embodiments of the present disclosure. For those of ordinary skill in the art, other drawings can be obtained based on these drawings without exerting creative efforts.

EXPLANATION OF REFERENCE NUMERALS

Figure 1:
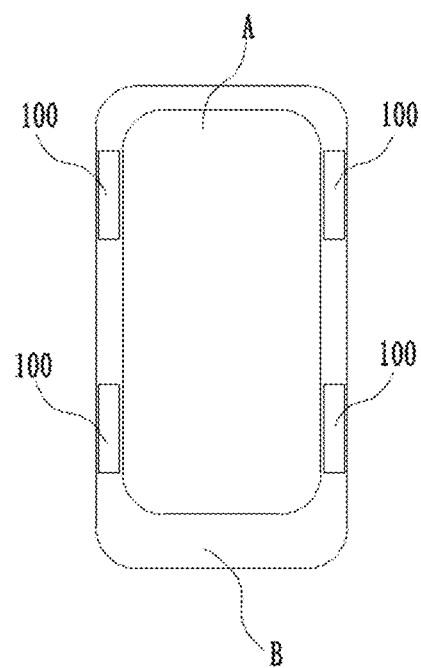
FIG. 1 is a top view of the display panel according to an embodiment of the present disclosure.

100. sensing module, 101. first sensing unit, 1011. first sensing transistor, 1012. first switch transistor, 1013. first storage capacitor; 102. second sensing unit, 1021. second sensing transistor, 1022. second switch transistor, 1023, second storage capacitor; 103, third sensing unit, 1031, third sensing transistor, 1032, third switch transistor, 1033, third storage capacitor;

1. base substrate; 2. buffer layer; 301. first active part, 302. second active part; 303. third active part, 304. fourth active part, 305. fifth active part; 306. sixth active part, 307. seventh active part; 4. gate insulation layer; 501. first gate, 502. second gate; 503. third gate, 504. fourth gate, 505, fifth gate; 506, sixth gate, 507, seventh gate, 508, eighth gate, 509, ninth gate; 6, dielectric layer; 701, first drain, 702, first source; 703, second drain, 704, second source, 705, third drain; 706, third source, 707, fourth drain, 708, fourth source, 709, fifth drain, 710, fifth source, 711, sixth drain, 712, sixth source, 713, seventh drain, 714, seventh source; 10. protective layer; 11. planarization layer; 120. first electrode, 121. first light shielding part, 122. second light shielding part, 123. third light shielding part; 13. pixel definition layer; 14. color filter layer, 141. first filter part, 142. second filter part, 143, third filter part, 144, light blocking part; 15, optical adhesive layer; 16, cover plate.

DETAILED DESCRIPTION OF THE EMBODIMENTS

Example embodiments will now be described more fully with reference to the accompanying drawings. Example embodiments may, however, be embodied in various forms and should not be construed as limited to the embodiments set forth herein. Rather, these embodiments are provided so that the present disclosure will be thorough and complete and will fully convey the concepts of the example embodiments to those skilled in the art. The same reference numerals in the drawings indicate the same or similar structures, and thus their detailed descriptions will be omitted. Furthermore, the drawings are merely schematic illustrations of the present disclosure and are not necessarily drawn to scale.

Although relative terms, such as "upper" and "lower" are used in this specification to describe the relative relationship between one component and another component represented by icons, these terms are used in this specification only for convenience, for example, base on the example direction described according to the drawings. It will be understood that if the device represented by an icon were turned upside down, components described as being on "top" would become components as at "bottom". When a structure is "on" another structure, it may mean that the structure is integrally formed on the other structure, or that the structure is "directly" placed on the other structure, or that the structure is "indirectly" placed on the other structure through an intermediate structure.

The terms "a", "an", "the", "said", and "at least one" are used to indicate the presence of one or more elements or components, etc. The terms "include" and "have" are used to indicate an open-ended inclusion and mean that there may be additional elements or components, etc. in addition to those listed. The terms "first", "second", "third" etc. are only used as a marker, not a limit on the number of the relevant objects.

As the quality of life improves, people have higher and higher requirements for display effects. Wide color gamut, high contrast, high refresh rate, and multi-level adjustment of brightness and color temperature are all the development directions of future displays. The color temperature is an indicator for evaluating the display tone. The lower the color temperature, the warmer the display tone, and the higher the color temperature, the cooler the display tone. Setting the right display color temperature can greatly improve the viewing experience.

However, under different ambient lights, even if the display is set to the same color temperature, different effects will appear when viewed by the human eye, causing problems such as color aberration. In order to improve the viewing performance, the display color temperature needs to be adjusted for different ambient lights.

As shown in FIGS. 1 to 20, embodiments of the present disclosure provide a display panel that can adjust the display color temperature. The display panel includes a display area A and a peripheral area B outside the display area A. The display panel also includes a base substrate 1 and at least one sensing module 100. The sensing module 100 is provided on a side of the base substrate 1 and is located in the peripheral area. The sensing module 100 includes at least one sensing unit. The sensing unit includes a sensing transistor. The first terminal of the sensing transistor receives an electrical signal. The control terminal of the sensing transistor receives a first control signal. The sensing transistor is used to receive ambient light, and convert the ambient light into an electrical signal, which is output by the second terminal of the sensing transistor.

When the gate of the sensing transistor receives the first control signal, the gate of the sensing transistor is set to an off state. When exposed to light, the voltage output by the drain of the sensing transistor will increase, and the voltage change is read as a photosensitive signal. Based on the response results to different wavelengths combined with the spectral characteristics of common ambient light, the identification of ambient light is completed. Based on this function, the display color temperature can be optimized to improve the display effect.

It should be noted that the electrical signal includes, but is not limited to, a voltage signal, and may also be configured as a current signal.

As shown in FIG. 1, the display panel includes a display area and a peripheral area outside the display area. The display panel also includes a base substrate 1 and four sensing modules 100. The four sensing modules 100 are disposed on one side of the base substrate 1. The four sensing modules 100 are evenly disposed in the peripheral area along the outline of the display panel.

Figure 2:
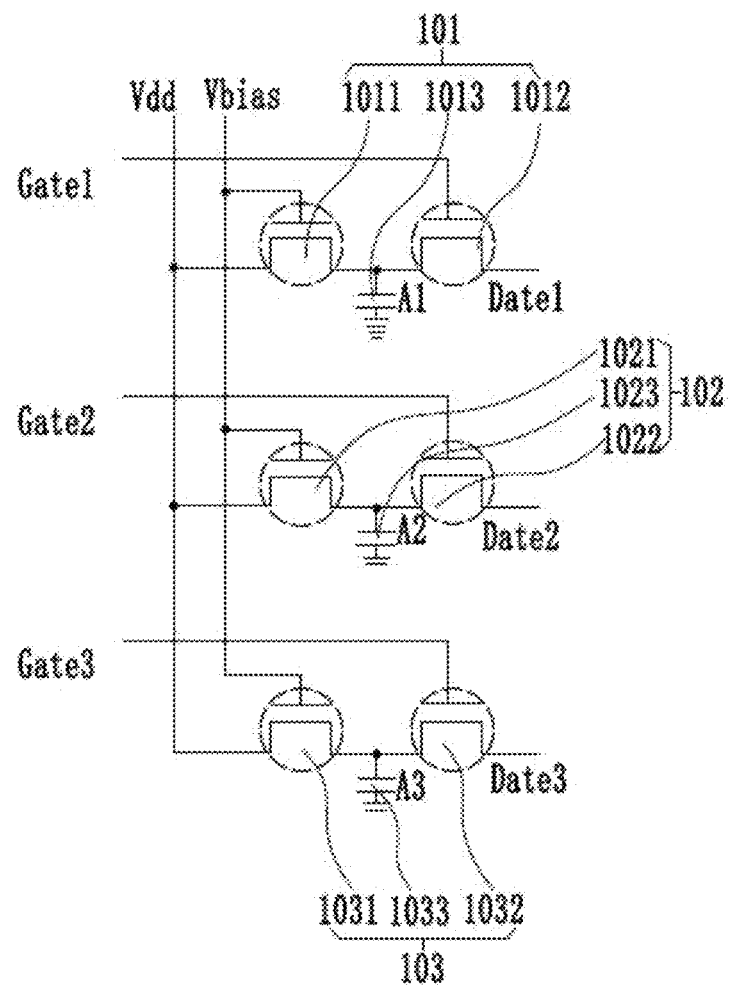
FIG. 2 is a circuit diagram of the sensing module according to an embodiment of the present disclosure.
Figure 3:
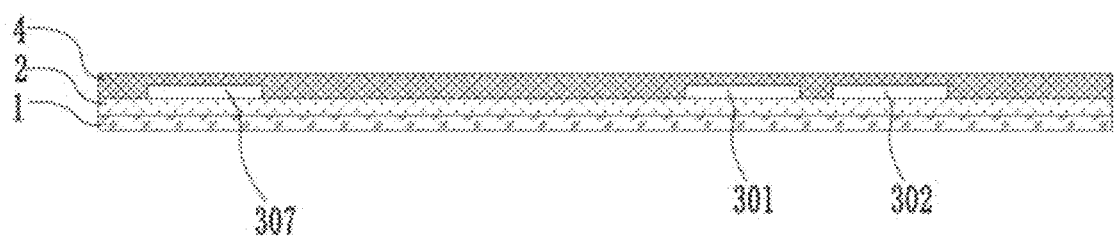
FIGS. 3 to 9 are schematic diagrams of the preparation process of the first display panel according to embodiments of the present disclosure.
Figure 4:
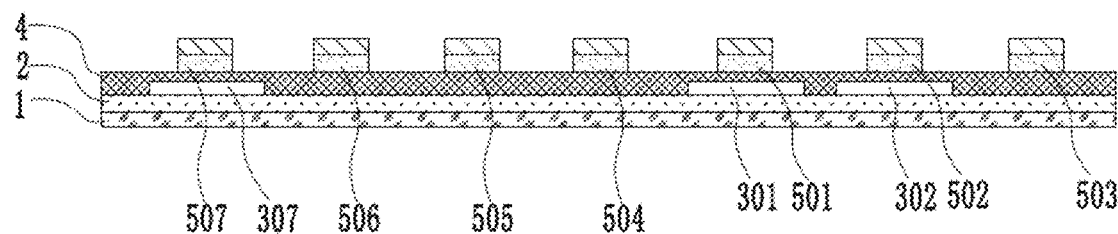
Figure 5:
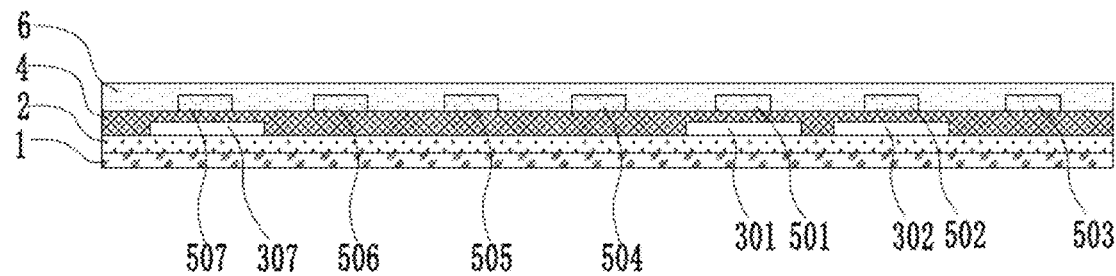
Figure 6:
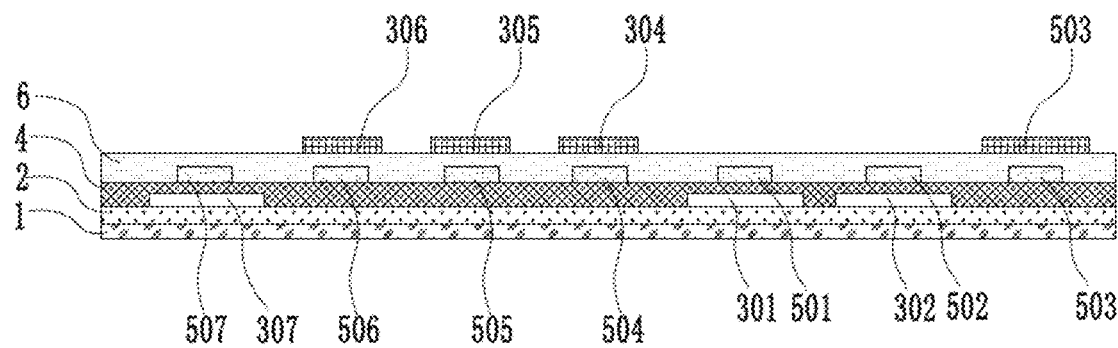
Figure 7:
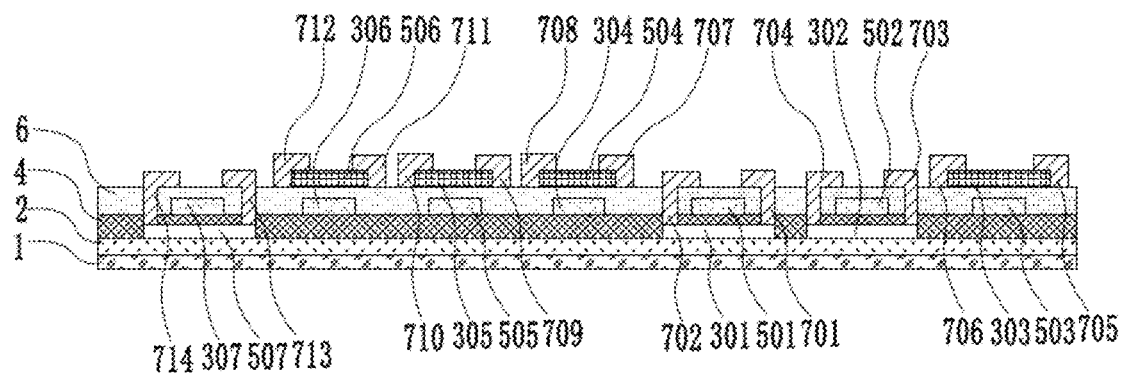
Figure 8:
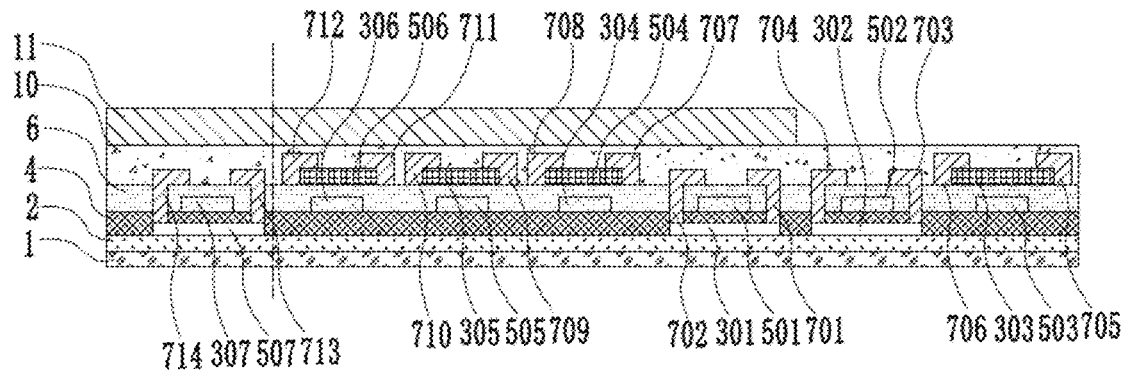

As shown in FIG. 2, the sensing module 100 includes a sensing unit. The sensing unit includes a sensing transistor, a storage capacitor, and a switch transistor. The first terminal of the sensing transistor receives the electrical signal vdd, the control terminal of the sensing transistor receives the first control signal vbias, and the second terminal of the sensing transistor is used to output the photosensitive signal. The first terminal of the storage capacitor is connected to the second terminal of the sensing transistor, and the second terminal of the storage capacitor is grounded, for storing the photosensitive signal output by the second terminal of the photosensitive transistor. The first terminal of the switch transistor is connected to the first terminal of the storage capacitor, and the control terminal of the switch transistor receives the second control signal for acquiring the photosensitive signal stored in the storage capacitor.

The number of the sensing units may be three, including the first sensing unit 101, the second sensing unit 102, and the third sensing unit 103. The sensing transistor of the first sensing unit 101 is the first sensing transistor 1011. The sensing transistor of the second sensing unit 102 is the second sensing transistor 1021. The sensing transistor of the third sensing unit 103 is the third sensing transistor 1031. The switch transistor of the first sensing unit 101 is the first switch transistor 1012. The switch transistor of the second sensing unit 102 is the second switch transistor 1022. The switch transistor of the third sensing unit 103 is the third switch transistor 1032. The storage capacitor of the first sensing unit 101 is the first storage capacitor 1013. The storage capacitor of the second sensing unit 101 is the second storage capacitor 1023. The storage capacitor of the third sensing unit 101 is the third storage capacitor 1033.

The first terminals of the sensing transistors of the three sensing units all receive electrical signals. The control terminals of the sensing transistors of the three sensing units receive the first control signal in sequence. The control terminals of the switch transistors of the three sensing units sequentially receive the second control signal for sequentially acquiring the photosensitive signals stored in the three storage capacitors. It should be noted that the number of the sensing units may also be increased or decreased according to photosensitive requirements. For example, the number of the sensing units is set to two or four.

The control process of the first sensing unit 101 will be described below. The first gate line Gate; stops inputting the second control signal, and the first switch transistor 1012 is turned off. At this time, the electrical signal vdd is set to V1, the first control signal vbias controls the first sensing transistor 1011 to turn on, and the voltage at point A1 becomes V1, which is stored in the first storage capacitor 1013.

Inputting of the first control signal vbias is stopped, and the first sensing transistor 1011 is turned off. At this time, the electrical signal vdd is set to $V_2$. When the first sensing transistor 1011 is exposed to light, the leakage current increases, and the voltage at point $A_1$ changes from $V_1$ to $V_2$. The second terminal of the first sensing transistor 1011 outputs a photosensitive signal, which is the voltage change at point $A_1$. The first storage capacitor 1013 stores the photosensitive signal output by the second terminal of the first sensing transistor 1011. The first gate Line Gate$_3$ inputs a second control signal, and the second control signal controls the first switch transistor 1012 to turn on. The voltage change amount at point $A_1$ is read through the data line Date$_1$ connected to the drain of the first switch transistor 1012. The voltage change amount can be used for detecting light of different wavelengths. The specific detecting process is not involved in the embodiments of the present disclosure, and will not be described in detail here.

The control process of the second sensing unit 102 will be described below. The second gate line Gate$_2$ stops inputting the second control signal, and the second switch transistor 1022 is turned off. At this time, the electrical signal vdd is set to $V_1$, the first control signal vbias controls the second sensing transistor 1021 to turn on, and the voltage at point $A_2$ becomes $V_1$ which is stored in the second storage capacitor 1023.

Inputting of the first control signal vbias is stopped, and the second sensing transistor 1021 is turned off. At this time, the electrical signal vdd is set to $V_2$. When the second sensing transistor 1021 is exposed to light, the leakage current increases, and the voltage at point $A_2$ changes from $V_1$ to $V_2$. The second terminal of the second sensing transistor 1021 outputs a photosensitive signal, which is the voltage change at point $A_2$. The second storage capacitor 1023 stores the photosensitive signal output by the second terminal of the second sensing transistor 1021. The second gate line $Gate_2$ inputs the second control signal, and the second control signal controls the second switch transistor 1022 to turn on. The voltage change at point $A_2$ is read through the data line $Date_2$ connected to the drain of the second switch transistor 1022.

The control process of the third sensing unit 103 will be described below. The third gate line $Gate_3$ stops inputting the second control signal, and the third switch transistor 1032 is turned off. At this time, the electrical signal vdd is set to $V_1$, the first control signal vbias controls the third sensing transistor 1031 to turn on, and the voltage at point $A_3$ becomes $V_1$ which is stored in the third storage capacitor 1033.

Inputting of the first control signal vbias is stopped, and the third sensing transistor 1031 is turned off. At this time, the electrical signal vdd is set to $V_2$. When the third sensing transistor 1031 is exposed to light, the leakage current increases, and the voltage at point $A_3$ changes from $V_1$ to $V_2$. The second terminal of the third sensing transistor 1031 outputs a photosensitive signal, which is the voltage change at point $A_3$. The photosensitive signal output by the second terminal of the sensing transistor is stored by the third storage capacitor 1033. The third gate line $Gate_3$ inputs a second control signal, and the second control signal controls the third switch transistor 1032 to turn on. The voltage change at point Aa is read through the data line $Date_3$ connected to the drain of the third switch transistor 1032.

By controlling the turn-on and turn-off sequence of the first switch transistor 1012, the second switch transistor 1022, and the third switch transistor 1032, the timing of reading the voltage changes at point $A_1$, point $A_2$, and point $A_3$ can be controlled.

Figure 9:
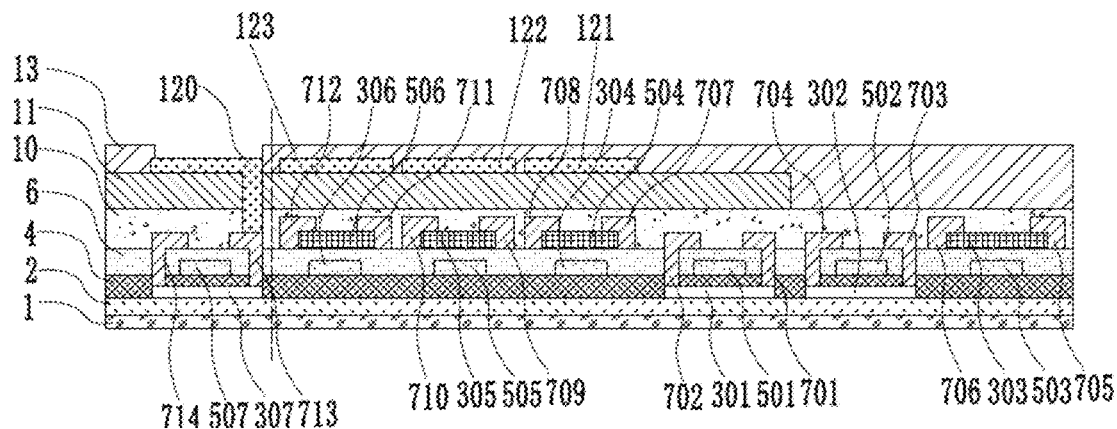

FIG. 9 shows the basic structure of the first display panel. The display panel has a display area and a peripheral area outside the display area. The display panel includes a base substrate 1. A buffer layer 2 is provided on one side of the base substrate 1. A driving layer group is provided on the side of the buffer layer 2 away from the base substrate 1, and the driving layer group is provided on a side of the base substrate 1. The driving layer group in the peripheral region includes a first sensing transistor, a first switch transistor, a second sensing transistor, a second switch transistor, a third sensing transistor, and a third switch transistor.

It should be noted that, for the convenience of description, the first sensing transistor is used to replace the sensing transistor of the first sensing unit 101, the second sensing transistor is used to replace the sensing transistor of the second sensing unit 102, and the third sensing transistor is used to replace the sensing transistor of the third sensing unit 103. Also, the first switch transistor replaces the switch transistor of the first sensing unit 101, the second switch transistor replaces the switch transistor of the second sensing unit 102, and the third switch transistor replaces the switch transistor of the third sensing unit 103.

The first sensing transistor and the second sensing transistor are both top-gate polysilicon transistors with transparent gates, and the third sensing transistor is a bottom-gate metal oxide transistor. The first sensing unit 101 is provided with a filter layer on the side away from the base substrate 1. The orthographic projection of the channel region of the first sensing transistor on the base substrate 1 is located within the orthographic projection of the filter layer on the base substrate 1. The filter layer is used to transmit monochromatic light, such as red light, green light, etc. The channel region of the second sensing transistor may absorb the full spectrum of visible light. The third sensing transistor is a bottom-gate metal oxide transistor that only absorbs ultraviolet light.

The first switch transistor, the second switch transistor, and the third switch transistor are all bottom-gate metal oxide transistors. The first switch transistor, the second switch transistor, and the third switch transistor are all bottom-gate metal oxide transistors that can be arranged together. That is, the first switch transistor, the second switch transistor, and the third switch transistor are arranged adjacent to each other. The first switch transistor, the second switch transistor, and the third switch transistor may also be arranged at intervals. That is, the first switch transistor is arranged on the side of the first sensing transistor away from the display area or close to the display area, the second switch transistor is arranged on the side of the second sensing transistor away from the display area or close to the display area, and the third switch transistor is arranged on a side of the third sensing transistor away from the display area or close to the display area. A first light shielding part 121 is provided on the side of the first switch transistor away from the base substrate 1. The orthographic projection of the first light shielding part 121 on the base substrate 1 completely covers the orthographic projection of the channel region of the first switch transistor on the base substrate 1. A second light shielding part 122 is provided on the side of the second switch transistor away from the base substrate 1. The orthographic projection of the second light shielding part 122 on the base substrate 1 completely covers the orthographic projection of the channel region of the second switch transistor on the base substrate 1. The switch transistor of the third sensing unit 103 is provided with a third light shielding part 123 on the side away from the base substrate. The orthographic projection of the third light shielding part 123 on the base substrate completely covers the orthographic projection of the channel region of the third switch transistor on the base substrate.

The driving layer group includes a first active layer, a gate insulation layer 4, a first gate layer, a dielectric layer 6, a second active layer, a first source-drain layer, a second source-drain layer, and a protective layer 10. The first active layer is disposed on one side of the base substrate 1. The gate insulation layer 4 is disposed on the side of the first active layer away from the base substrate 1, covering the first active layer and the base substrate 1. The first gate layer is provided on the side of the gate insulation layer 4 away from the base substrate 1. The dielectric layer 6 is provided on the side of the gate layer away from the base substrate 1. The dielectric layer 6 covers the first gate layer and the gate insulation layer 4. The second active layer is disposed on the side of the dielectric layer 6 away from the base substrate 1. The first source-drain layer is disposed on the side of the dielectric layer 6 away from the base substrate 1. The second source-drain layer is disposed on the side of the second active layer away from the base substrate 1. The protective layer 10 covers the first source-drain layer and the second source-drain layer. The first active layer is a polysilicon layer. The second active layer is a metal oxide layer that only transmits ultraviolet light, such as indium gallium zinc oxide (IGZO). The first gate layer is a transparent conductive layer, such as indium tin oxide (ITO).

The first active layer in the peripheral area includes a first active part 301 and a second active part 302. The first gate layer in the peripheral area includes a first gate 501, a second gate 502, a third gate 503, a fourth gate 504, a fifth gate 505, and a sixth gate 506. The first source-drain layer in the peripheral area includes a first source 702 and a first drain 701, and a second source 704 and a second drain 703. The orthographic projection of the first gate 501 on the base substrate 1 is located within the orthographic projection of the first active part 301 on the base substrate 1. The orthographic projection of the second gate 502 on the base substrate 1 is located within the orthographic projection of the second active part 302 on the base substrate 1. The first source 702 and the first drain 701 are respectively connected to the first active part 301. The second source 704 and the second drain 703 are respectively connected to the second active part 302.

The second active layer includes a third active part 303, a fourth active part 304, a fifth active part 305, and a sixth active part 306. The second source-drain layer includes a third source 706 and a third drain 705, a fourth source 708 and a fourth drain 707, a fifth source 710 and a fifth drain 709, and a sixth source 712 and a sixth drain 711. The orthographic projection of the third gate 503 on the base substrate 1 is located within the orthographic projection of the third active part 303 on the base substrate 1. The orthographic projection of the fourth gate 504 on the base substrate 1 is located within the orthographic projection of the fourth active part 304 on the base substrate 1. The orthographic projection of the fifth gate 505 on the base substrate 1 is located within the orthographic projection of the fifth active part 305 on the base substrate 1. The orthographic projection of the sixth gate 506 on the base substrate 1 is located within the orthographic projection of the sixth active part 306 on the base substrate 1. The third source 706 and the third drain 705 are respectively connected to the third active part 303. The fourth source 708 and the fourth drain 707 are respectively connected to the fourth active part 304. The fifth source 710 and the fifth drain 709 are connected to the fifth active part 305 respectively. The sixth source 712 and the sixth drain 711 are connected to the sixth active part 306 respectively.

Figure 10:
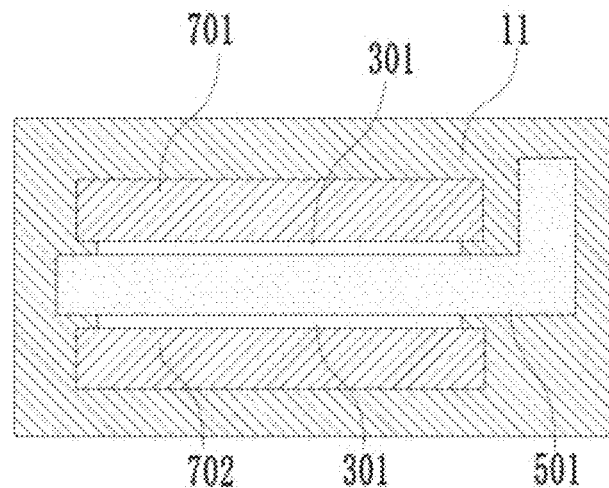
FIG. 10 is a top view of the first sensing transistor of the first display panel according to an embodiment of the present disclosure.
Figure 11:
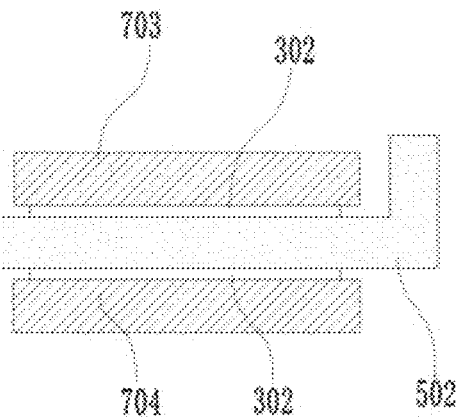
FIG. 11 is a top view of the second sensing transistor of the first display panel according to an embodiment of the present disclosure.
Figure 12:
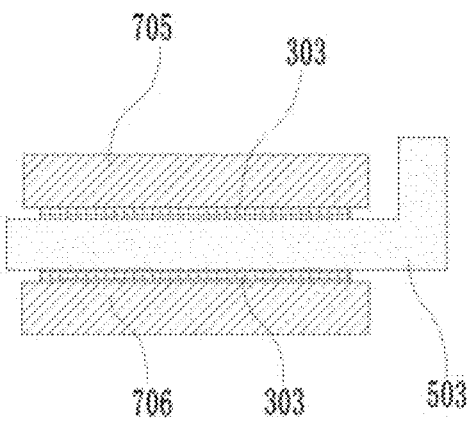
FIG. 12 is a top view of the third sensing transistor of the first display panel according to an embodiment of the present disclosure.
Figure 13:
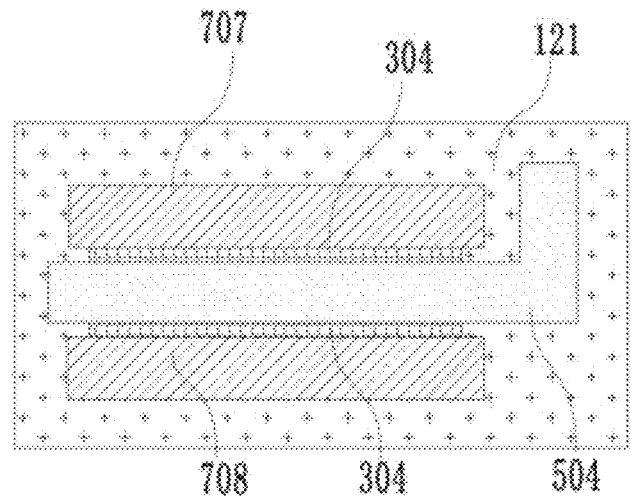
FIG. 13 is a top view of the switch transistor of the first display panel according to an embodiment of the present disclosure.
Figure 14:
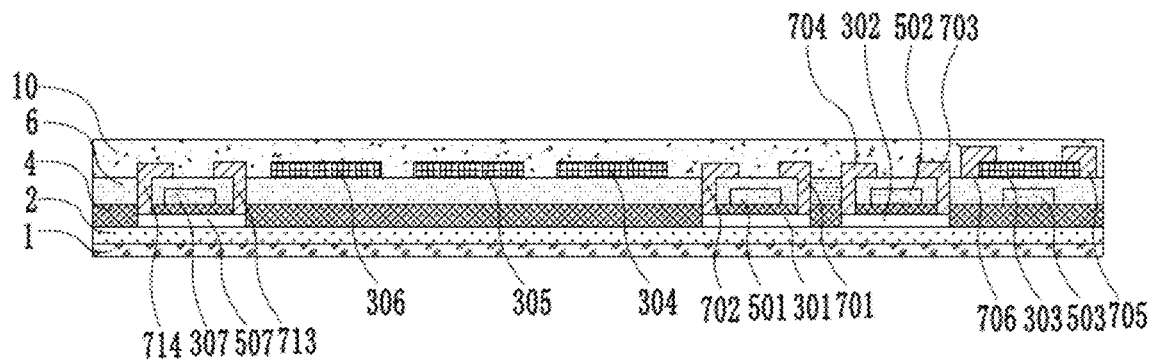
FIGS. 14 to 17 are schematic diagrams of the preparation process of the second display panel according to embodiments of the present disclosure.
Figure 15:
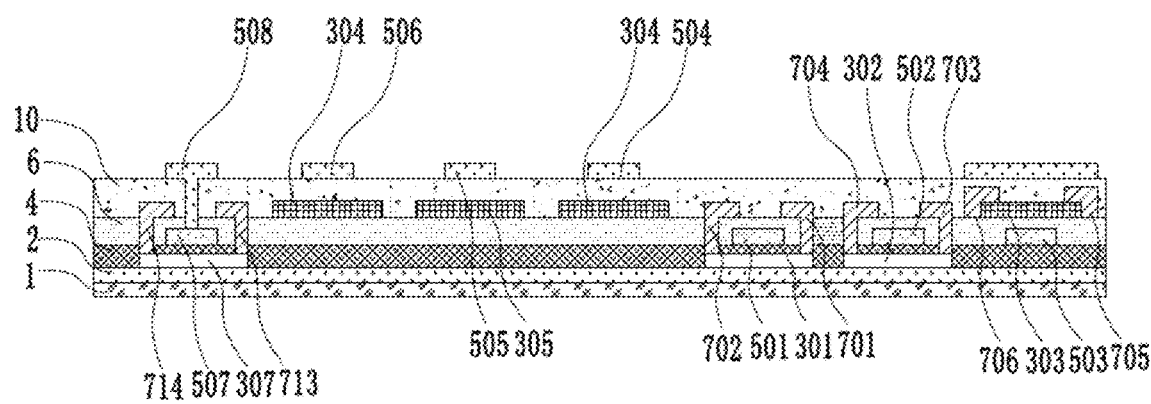
Figure 16:
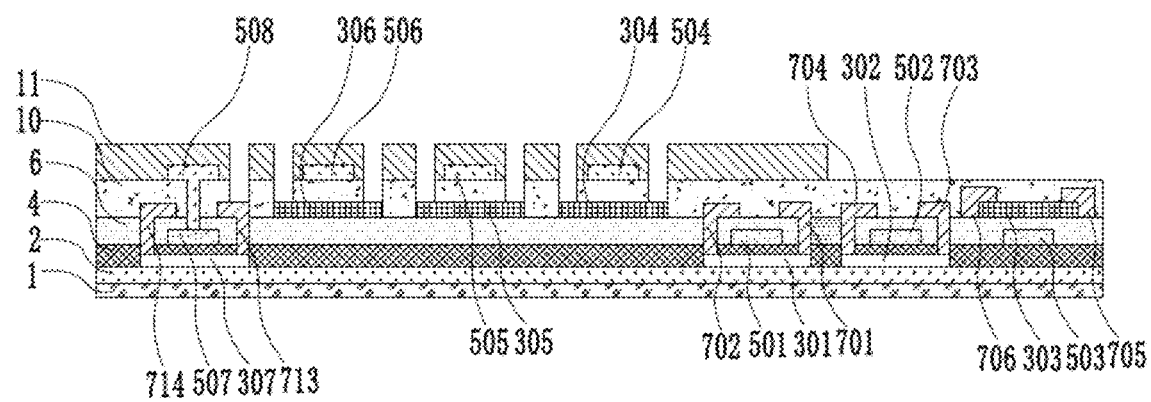

As shown in FIG. 10, the first sensing transistor includes a first active part 301, a first gate 501, a first source 702, and a first drain 701. As shown in FIG. 11, the second sensing transistor includes a second active part 302, a second gate 502, a second source 704, and a second drain 703. As shown in FIG. 12, the third sensing transistor includes a third active part 303, a third gate 503, a third source 706, and a third drain 705. As shown in FIG. 13, the first switch transistor includes a fourth active part 304, a fourth gate 504, a fourth source 708, and a fourth drain 707. The second switch transistor includes a fifth active part 305, a fifth gate 505, a fifth source 710, and a fifth drain 709. The third switch transistor includes a sixth active part 306, a sixth gate 506, a sixth source 712, and sixth drain 711.

The filter layer may be a planarization layer 11. The planarization layer 11 is provided on a side of the protective layer 10 away from the base substrate 1. The orthographic projection of the channel region of the first sensing transistor on the base substrate 1 is located within the orthographic projection of the planarization layer 11 on the base substrate 1. Referring to FIG. 10, the distance between the edge of the orthographic projection of the filter layer on the base substrate 1 and the edge of the orthogonal projection of the active layer of the first sensing transistor on the base substrate 1 is greater than 3 μm. That is, the distance between the edge of the orthogonal projection of the filter layer on the base substrate 1 and the edge of the orthogonal projection of the first active part 301 on the base substrate 1 is greater than 3 μm to ensure the light filtering effect. The planarization layer 11 may transmit monochromatic light, which includes, but is not limited to, red light, and may also be blue light or green light.

The first light shielding part 121, the second light shielding part 122, and the third light shielding part 123 are provided on the side of the planarization layer 11 away from the base substrate 1. The orthographic projection of the first light shielding part 121 on the base substrate 1 may cover at least the orthographic projection of the channel region of the fourth active part 304 on the base substrate 1. The orthogonal projection of the second light shielding part 122 on the base substrate 1 may at least cover the orthographic projection of the channel region of the fifth active part 305 on the base substrate 1. The orthographic projection of the third light shielding part 123 on the base substrate 1 may at least cover the orthographic projection of the channel region of the sixth active part 306 on the base substrate 1. Referring to FIG. 13, the distance between edges of the orthographic projection of the first light shielding part 121 on the base substrate 1 and the orthographic projection of the channel region of the fourth active part 304 on the base substrate 1 is greater than 3 μm. Similarly, the distance between edges of the orthographic projection of the second light shielding part 122 on the base substrate 1 and the orthographic projection of the channel region of the fifth active part 305 on the base substrate 1 is greater than 3 μm. The distance between edges of the orthographic projection of the third light shielding part 123 on the base substrate 1 and the orthographic projection of the channel region of the sixth active part 306 on the base substrate 1 is greater than 3 μm. This helps to ensure the light shielding effect.

The driving layer group in the display area includes a driving transistor. The first active layer in the display area also includes a seventh active part 307. The first gate layer also includes a seventh gate 507. The first source-drain layer also includes a seventh source 714 and a seventh drain 713. The orthographic projection of the seventh gate 507 on the base substrate 1 are located within the orthographic projection of the seventh active part 307 on the base substrate 1. The seventh source 714 and the seventh drain 713 are respectively connected to the seventh active part 307. A first electrode 120 is provided on the side of the planarization layer 11 away from the base substrate 1. The first electrode 120 passes through the via holes on the planarization layer 11 and the protective layer 10 and is connected to the seventh drain 713. The first electrode 120 is arranged in the same layer and with the same material as the first light shielding part 121, the second light shielding part 122, and the third light shielding part 123.

As shown in FIGS. 3 to 9, the preparation process of the display panel is as follows. First, a buffer layer 2 is deposited on the base substrate 1, and a polysilicon layer is deposited on the side of the buffer layer 2 away from the base substrate 1 and patterned to form a first active layer. The first active layer includes a first active part 301, a second active part 302, and a seventh active part 307. The first active layer is covered with a gate insulation layer 4. A first gate layer is deposited on the gate insulation layer 4. The first gate layer is a transparent conductive layer. The first gate layer includes a first gate 501, a second gate 502, a third gate 503, a fourth gate 504, a fifth gate 505, a sixth gate 506, and a seventh gate 507. The photoresist is coated and a photolithography process is performed. The first gate layer and the photoresist are used as masks to perform an N+ doping process to form doped regions on the first active part 301, the second active part 302, and the seventh active part 307. A dielectric layer 6 is deposited on the side of the first gate layer away from the base substrate 1, and the dielectric layer 6 covers the first gate layer and the gate insulation layer 4.

A second active layer is formed on the side of the dielectric layer 6 away from the base substrate 1, and then the dielectric layer 6 is patterned. A first source-drain layer and a second source-drain layer are formed. The first source-drain layer includes a first source 702 and a first drain 701, a second source 704 and a second drain 703, and a seventh source 714 and a seventh drain 713. The first source 702 and the first drain 701 are respectively connected to two corresponding doped regions of the first active part 301 through via holes. The second source 704 and the second drain 703 are respectively connected to two corresponding doped regions of the second active part 302 through via holes. The seventh source 714 and the seventh drain 713 are respectively connected to two corresponding doped regions of the seventh active part 307 through via holes. The second source-drain layer includes a third source 706 and a third drain 705, a fourth source 708 and a fourth drain 707, a fifth source 710 and a fifth drain 709, and a sixth source 712 and a sixth drain 711. The third source 706 and the third drain 705 are respectively connected to two corresponding doped regions of the third active part 303. The fourth source 708 and the fourth drain 707 are respectively connected to two corresponding doped regions of the fourth active part 304. The fifth source 710 and the fifth drain 709 are respectively connected to two corresponding doping regions of the fifth active part 305. The sixth source 712 and the sixth drain 711 are respectively connected to two corresponding doped regions of the sixth active part 306. The protective layer 10 is formed on the side of the first source-drain layer and the second source-drain layer away from the base substrate 1.

A planarization layer 11 is formed on the side of the protective layer 10 away from the first sensing unit 101 and away from the base substrate 1. The orthographic projection of the planarization layer 11 on the base substrate 1 may at least cover the orthographic projection of the first active part 301 on the base substrate 1. The first electrode layer is deposited and patterned to form the first light shielding part 121, the second light shielding part 122, and the third light shielding part 123 on the side of the switch transistor away from the base substrate 1. The first electrode 120 is formed on the side of the driving transistor away from the base substrate 1. The first pixel definition layer 13 is covered and patterned on the side of the first electrode layer away from the base substrate 1 to complete the preparation of a display backplane with a color temperature compensation function.

It can be understood that since the planarization layer 11 only transmits red light, the first sensing transistor only absorbs red light. The second sensing transistor absorbs the full spectrum of visible light. The third active part 303 only absorbs ultraviolet light, and thus the third sensing transistor only absorbs ultraviolet light. According to the light response of different sensing transistors and the spectral characteristics of the ambient light source, the ambient light can be identified to adjust the display color temperature.

Figure 17:
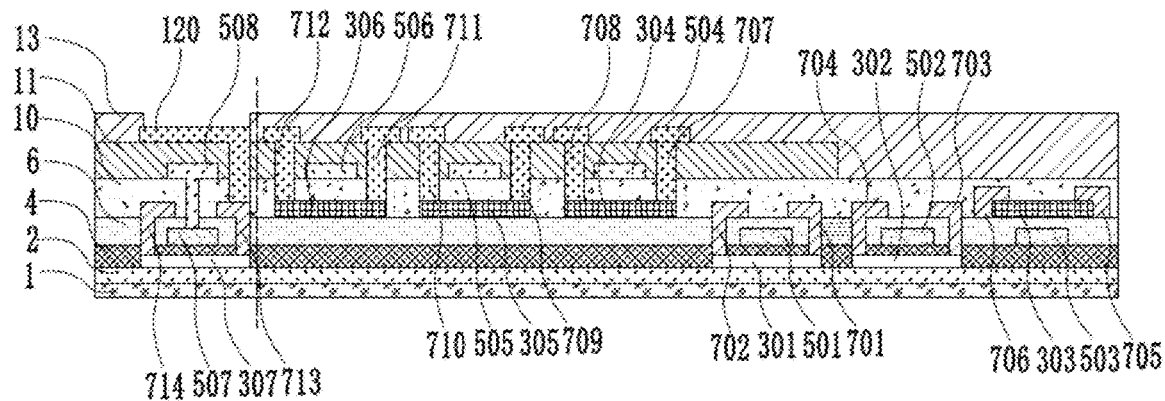

FIG. 17 shows the basic structure of the second display panel. The difference from the first display panel is that the first switch transistor, the second switch transistor, and the third switch transistor in this display panel are all top-gate oxide transistors.

Specifically, a second gate layer is provided on the side of the protective layer 10 away from the base substrate 1. The second gate layer in the peripheral area includes a fourth gate 504, a fifth gate 505, and a sixth gate 506. The orthographic projection of the fourth gate 504 on the base substrate 1 is located within the orthographic projection of the fourth active part 304 on the base substrate 1. The orthogonal projection of the fifth gate 505 on the base substrate 1 is located within the orthographic projection of the fifth active part 305 on the base substrate 1. The orthographic projection of the sixth gate 506 on the base substrate 1 is located within the orthographic projection of the sixth active part 306 on the base substrate 1.

Specifically, the orthographic projection of the fourth gate 504 on the base substrate 1 may coincide with the orthographic projection of the fourth active part 304 on the base substrate 1. The orthographic projection of the fifth gate 505 on the base substrate 1 may coincide with the orthographic projection of the fifth active part 305 on the base substrate 1. The orthographic projection of the sixth gate 506 on the base substrate 1 may coincide with the orthographic projection of the sixth active part 306 on the base substrate 1. Alternatively, the orthographic projection of the fourth gate 504 on the base substrate 1 is slightly smaller than the orthographic projection of the fourth active part 304 on the base substrate 1. The orthographic projection of the fifth gate 505 on the base substrate 1 is slightly smaller than the orthographic projection of the fifth active part 305 on the base substrate 1. The orthographic projection of the sixth gate 506 on the base substrate 1 is slightly smaller than the orthographic projection of the sixth active part 306 on the base substrate 1.

It can be understood that the first switch transistor, the second switch transistor, and the third switch transistor in the display panel may eliminate the influence of ambient light in different ways when turned off. Here, the fourth gate 504 blocks the fourth active part 304, the fifth gate 505 blocks the fifth active part 305, and the sixth gate 506 blocks the sixth active part 306, thereby preventing ambient light from affecting the fourth active part 304, the fifth active part 305, and the sixth active part 306.

The fourth source 708 and the fourth drain 707, the fifth source 710 and the fifth drain 709, the sixth source and the sixth drain 711 are all located on the first electrode layer. The fourth source 708 and the fourth drain 707 are respectively connected to the fourth active part 304 by via holes passing through the protective layer 10 and the planarization layer 11. The fifth source 710 and the fifth drain 709 are respectively connected to the fifth active part 305 by via holes passing through the protective layer 10 and the planarization layer 11. The sixth source 712 and the sixth drain 711 are respectively connected to the sixth active part 306 by via holes passing through the protective layer 10 and the planarization layer 11.

The driving layer group in the display area includes a driving transistor. The first active layer in the display area also includes a seventh active part 307. The second gate layer also includes an eighth gate 508. The orthographic projections of the eighth gate 508 and the seventh gate 507 on the base substrate 1 coincide with each other, and are located within the orthographic projection of the seventh active part 307 on the base substrate 1. The eighth gate 508 is connected to the seventh gate 507 through the via holes on the protective layer 10 and the dielectric layer 6. A first electrode 120 is provided on the side of the planarization layer 11 away from the base substrate 1. The first electrode 120 passes through the via holes on the planarization layer 11 and the protective layer 10 and is connected to the seventh drain 713. The first electrode 120 is located on the first electrode layer.

As shown in FIGS. 14 to 17, the preparation process of the display panel is as follows. Firstly, a buffer layer 2 is deposited on the base substrate 1. A polysilicon layer is deposited on the side of the buffer layer 2 away from the base substrate 1 and patterned to form a first active layer. The first active layer includes a first active part 301, a second active part 302, and a seventh active part 307. The first active layer is covered with a gate insulation layer 4. A first gate layer is deposited on the gate insulation layer 4. The first gate layer is a transparent conductive layer. The first gate layer includes a first gate 501, a second gate 502, a third gate 503, and a seventh gate 507. The photoresist is coated and a photolithography and etching process is performed. The first gate layer and the photoresist are used as masks to perform an N+ doping process, so as to form doped regions on the first active part 301, the second active part 302, and the seventh active part 307. A dielectric layer 6 is deposited on the side of the first gate layer away from the base substrate 1. The dielectric layer 6 covers the first gate layer and the gate insulation layer 4.

A second active layer is formed on the side of the dielectric layer 6 away from the base substrate 1, and then the dielectric layer 6 is patterned. A first source-drain layer and a second source-drain layer are formed. The first source-drain layer includes a first source 702 and a first drain 701, a second source 704 and a second drain 703, and a seventh source. 714 and a seventh drain 713. The first source 702 and the first drain 701 are respectively connected to two corresponding doped regions of the first active part 301 through via holes. The second source 704 and the second drain 703 are respectively connected to two corresponding doped regions of the second active part 302 through via holes. The seventh source 714 and the seventh drain 713 are respectively connected to two corresponding doped regions of the seventh active part 307 through via holes.

The second source-drain layer includes a third source 706 and a third drain 705. The third source 706 and the third drain 705 are respectively connected to two corresponding doped regions of the third active part 303. The protective layer 10 is formed on the side of the first source-drain layer and the second source-drain layer away from the base substrate 1. A second gate layer is formed on the side of the protective layer 10 away from the base substrate 1. The second gate layer includes a fourth gate 504, a fifth gate 505, a sixth gate 506, an eighth gate 508, and a ninth gate 509. An N+ doping process is performed by using the second gate layer and the photoresist as masks. The lapping area of the seventh active part 307 with respect to the seventh source 714 and the seventh drain 713 is caused to be conductive. The planarization layer 11 is formed on the side of the second gate layer away from the base substrate 1. The orthographic projection of the planarization layer 11 on the base substrate 1 at least covers the orthographic projection of the first active part 301 on the base substrate 1. The ninth gate 509 corresponding to the third sensing transistor 1031 is removed by wet etching.

A first electrode layer is deposited and patterned. The first electrode layer includes a fourth source 708 and a fourth drain 707, a fifth source 710 and a fifth drain 709, and a sixth source 712 and a sixth drain 711. The first electrode 120, the fourth source 708, and the fourth drain 707 are respectively connected to two corresponding doped regions of the fourth active part 304. The fifth source 710 and the fifth drain 709 are respectively connected to two corresponding doped regions of the fifth active part 305. The sixth source 712 and the sixth drain 711 are respectively connected to two corresponding doped regions of the sixth active part 306. The first electrode 120 passes through the via holes on the planarization layer 11 and the protective layer 10 and is connected to the seventh drain 713. The first pixel definition layer 13 is covered and patterned on the side of the first electrode layer away from the base substrate 1, so as to complete the preparation process of a display backplane with a color temperature compensation function.

Figure 18:
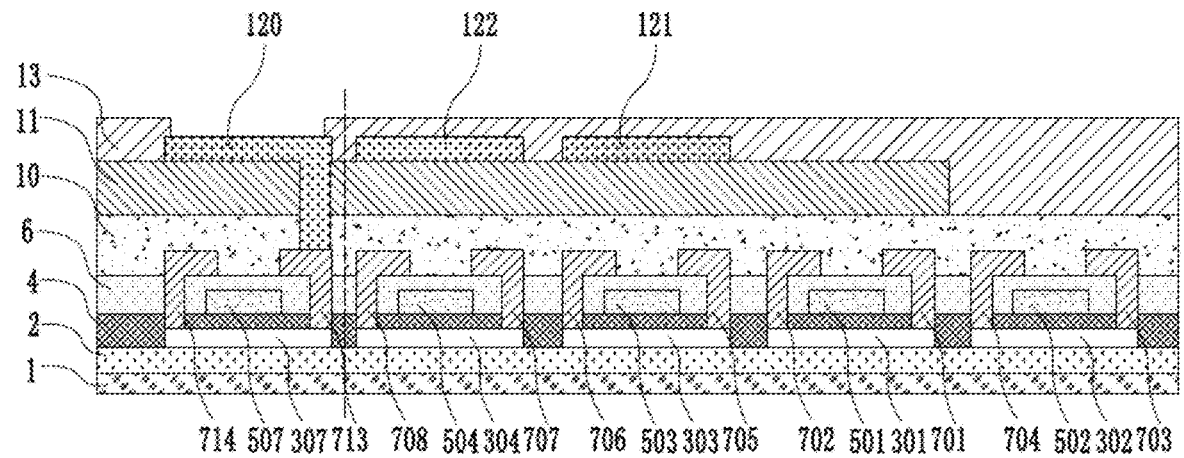
FIG. 18 is a schematic structural diagram of the third display panel according to an embodiment of the present disclosure.

The difference between the third display panel and the first display panel is that the sensing module 100 of the display panel does not include the third sensing unit 103. Accordingly, the third sensing unit 103 also needs to be removed from FIG. 2. FIG. 18 shows the basic structure of the third display panel. Both the first switch transistor and the second switch transistor are top-gate polysilicon transistors.

Specifically, the driving layer group in the peripheral area only includes the first active layer, the first gate layer, and the first source-drain layer. The first active layer only includes the first active part 301, the second active part 302, the third active part 303, and the fourth active part 304. The first source-drain layer includes a first source 702 and a first drain 701, a second source 704 and a second drain 703, a third source 706 and a third drain 705, a fourth source 708 and a fourth drain 707. The first source 702 and the first drain 701 are respectively connected to the first active part 301. The second source 704 and the second drain 703 are respectively connected to the second active part 302. The third source 706 and the third drain 705 are connected to the third active part 303 respectively. The fourth source 708 and the fourth drain 707 are connected to the fourth active part 304 respectively.

A first light shielding part 121 is provided on the side of the first switch transistor away from the base substrate 1. The orthographic projection of the first light shielding part 121 on the base substrate 1 completely covers the orthographic projection of the channel region of the third active part 303 on the base substrate 1. The switch transistor of the second sensing unit 102 is provided with a second light shielding part 122 on the side away from the base substrate 1. The orthographic projection of the second light shielding part 122 on the base substrate 1 completely covers the orthographic projection of the channel region of the fourth active part 304 on the base substrate 1.

The preparation process of the display panel is as follows. First, a buffer layer 2 is deposited on the base substrate 1, and a polysilicon layer is deposited on the side of the buffer layer 2 away from the base substrate 1 and patterned to form a first active layer. The first active layer includes a first active part 301, a second active part 302, a third active part 303, a fourth active part 304, and a seventh active part 307. The first active layer is covered with a gate insulation layer 4. A first gate layer is deposited on the gate insulation layer 4. The first gate layer is a transparent conductive layer. The first gate layer includes a first gate 501, a second gate 502, a third gate 503, a fourth gate 504, and a seventh gate 507. The photoresist is coated and a photolithography and etching process is performed. The first gate layer and the photoresist are used as masks to perform an N+ doping process, so as to form doped regions on the first active part 301, the second active part 302, the third active part 303, the fourth active part 304, and the seventh active part 307. A dielectric layer 6 is deposited on the side of the first gate layer away from the base substrate 1. The dielectric layer 6 covers the first gate layer and the gate insulation layer 4.

A first source-drain layer is formed on the side of the dielectric layer 6 away from the base substrate 1. The first source-drain layer includes a first source 702 and a first drain

701, a second source 704 and a second drain 703, a third source 706 and a third drain 705, a fourth source 708 and a fourth drain 707, and a seventh source 714 and a seventh drain 713. The first source 702 and the first drain 701 are respectively connected to two corresponding doped regions of the first active part 301 through the via holes. The second source 704 and the second drain 703 are respectively connected to two corresponding doped regions of the second active part 302 through the via holes. The third source 706 and the third drain 705 are respectively connected to two corresponding doping regions of the third active part 303. The fourth source 708 and the fourth drain 707 are respectively connected to two corresponding doped regions of the fourth active part 304. The seventh source 714 and the seventh drain 713 are respectively connected to two corresponding doped regions of the seventh active part 307. The protective layer 10 is formed on the side of the first source-drain layer away from the base substrate 1.

A planarization layer 11 is formed on the side of the protective layer 10 away from the first sensing unit 101 and away from the base substrate 1. The orthographic projection of the planarization layer 11 on the base substrate 1 may at least cover the orthographic projection of the first active part 301 on the base substrate 1. The first electrode layer is deposited and patterned to form the first electrode layer on the side of the switch transistor away from the base substrate 1. The first electrode layer includes a first light shielding part 121, a second light shielding part 122, and a first electrode 120. The first pixel definition layer 13 is covered and patterned on the side of the first electrode layer away from the base substrate 1, so as to complete the preparation process of a display backplane with a color temperature compensation function. It can be understood that this display panel can sense red light and full-spectrum visible light, but cannot sense ultraviolet light, and is only suitable for indoor use.

Figure 19:
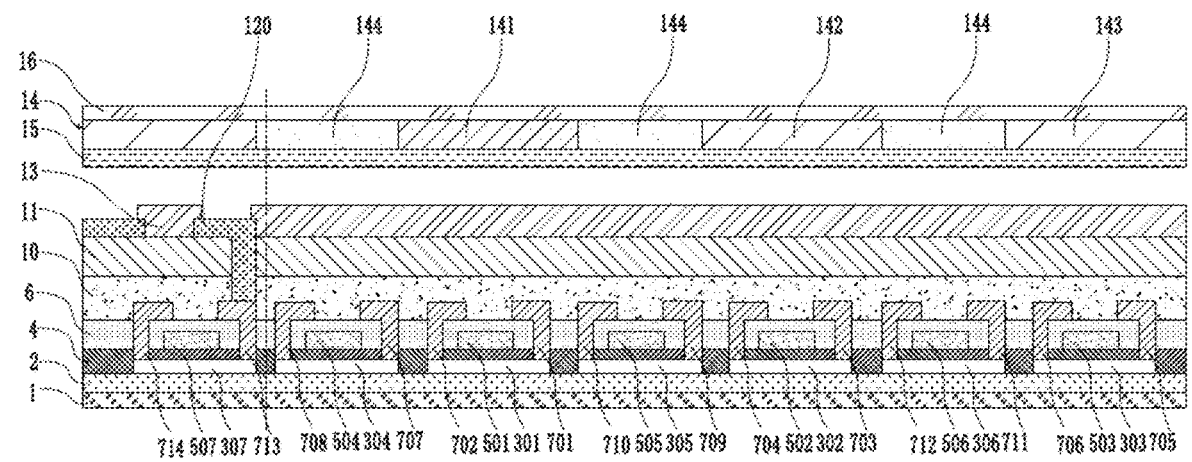
FIG. 19 is a schematic structural diagram of the fourth display panel according to an embodiment of the present disclosure.

FIG. 19 shows the basic structure of the fourth display panel. The difference from the first display panel is that the first sensing transistor, the second sensing transistor, and the third sensing transistor are all top-gate polysilicon transistors with transparent gates. The planarization layer 11 provided on the side of the first sensing unit 101 away from the base substrate 1 does not have a light filtering function.

The planarization layer 11 is provided with an optical adhesive layer 15 on the side away from the base substrate 1. A color filter layer 14 is provided on the side of the optical adhesive layer 15 away from the base substrate 1. A cover plate 16 is provided on the side of the color filter layer 14 away from the base substrate. The color filter layer 14 includes a plurality of filter parts of different colors. Each filter part corresponds to one of the sensing transistors. The orthographic projection of the channel region of the sensing transistor on the base substrate 1 is located within the orthographic projection of the filter part on the base substrate 1. A light blocking part is provided between adjacent filter parts. Each light blocking part corresponds to the switch transistor of one sensing unit. The orthographic projection of the channel region of the switch transistor on the base substrate 1 is located within the orthographic projection of the light blocking part on the base substrate 1.

The orthographic projection of the channel region of the first sensing transistor on the base substrate 1 is located within the orthographic projection of the first filter part 141 on the substrate 1. The orthographic projection of the channel region of the second sensing transistor on the base substrate 1 is located within the orthographic projection of the second filter part 142 on the base substrate 1. The orthographic projection of the channel region of the third sensing transistor on the base substrate 1 is located within the orthographic projection of the third filter part 143 on the base substrate 1. The orthographic projections of the channel region of the first switch transistor, the channel region of the second switch transistor, and the channel region of the third switch transistor on the base substrate 1 are located within the orthographic projection of the corresponding light blocking part 144 on the base substrate 1 respectively.

Specifically, the driving layer group in the peripheral area only includes the first active layer, the first gate layer, and the first source-drain layer. The first active part 301, the second active part 302, the third active part 303, the fourth active part 304, the fifth active part 305, and the sixth active part 306 are all located on the first active layer. The orthographic projection of the channel region of the first active part 301 on the base substrate 1 is located with the orthographic projection of the first filter part 141 on the base substrate 1. The orthographic projection of the channel region of the second active part 302 on the base substrate 1 is located within the orthographic projection of the second filter part 142 on the base substrate 1. The orthographic projection of the channel region of the third active part 303 on the base substrate 1 is located within the orthographic projection of the third filter part 143 on the base substrate 1. The orthographic projections of the fourth active part 304, the fifth active part 305, and the sixth active part 306 on the base substrate 1 are located within the orthographic projection of the corresponding light shielding part 144 on the base substrate 1 respectively.

The first source 702 and the first drain 701, the second source 704 and the second drain 703, the third source 706 and the third drain 705, the fourth source 708 and the fourth drain 707, the fifth source 710 and the fifth drain 709, and the sixth source 712 and the sixth drain 711 are all located on the first source-drain layer. The first source 702 and the first drain 701 are respectively connected to the first active part 301. The second source 704 and the second drain 703 are connected to the second active part 302 respectively. The third source 706 and the third drain 705 are connected to the third active part 303 respectively. The fourth source 708 and the fourth drain 707 are respectively connected with the fourth active part 304. The fifth source 710 and the fifth drain 709 are respectively connected to the fifth active part 305. The sixth source 712 and the sixth drain 711 are respectively connected to the sixth active part 306. The first gate layer includes a first gate 501, a second gate 502, a third gate 503, a fourth gate 504, a fifth gate 505, and a sixth gate 506, and is disposed on the side of the gate insulation layer 4 away from the base substrate 1.

Figure 20:
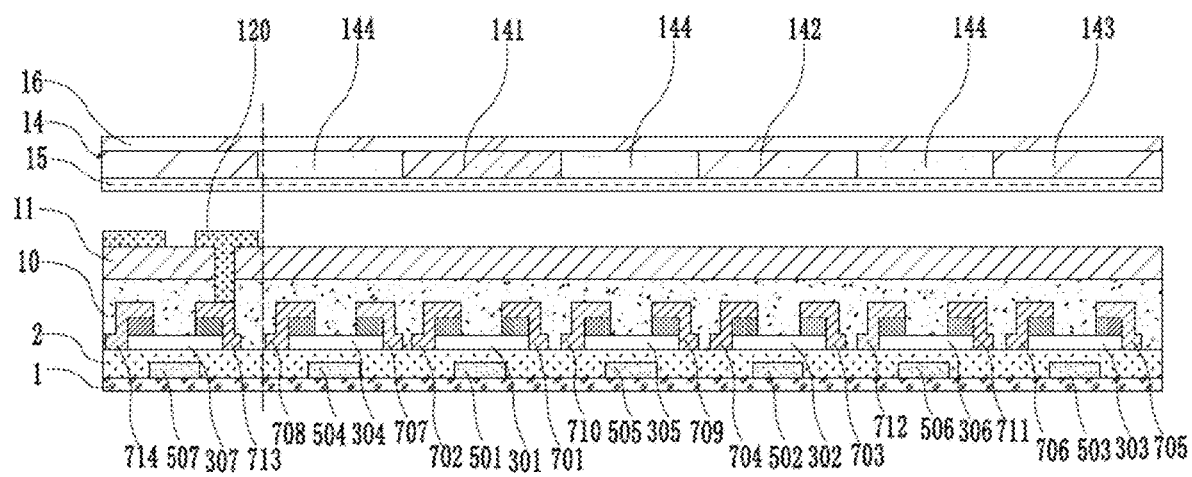
FIG. 20 is a schematic structural diagram of the fifth display panel according to an embodiment of the present disclosure.

FIG. 20 shows the basic structure of the fifth display panel. The difference from the first display panel is that the planarization layer 11 provided on the side of the first sensing transistor away from the base substrate 1 does not have a light filtering function. The first sensing transistor, the second sensing transistor, and the third sensing transistor are all bottom-gate polysilicon transistors with transparent gates.

Specifically, the first gate layer of the display panel includes a first gate 501, a second gate 502, a third gate 503, a fourth gate 504, a fifth gate 505, a sixth gate 506, and a seventh gate 507. The first gate layer is provided on one side of the base substrate 1. The buffer layer 2 is provided on the side of the first gate layer away from the base substrate 1. This display panel does not have a gate insulation layer 4, and the buffer layer 2 is used as the gate insulation layer 4. A doped layer is formed on the side of the first active part 301, the second active part 302, the third active part 303, the fourth active part 304, the fifth active part 305, and the sixth active part 306 away from the base substrate 1. The first source 702 and the first drain 701 are respectively connected to the first active part 301 through the doped regions on both sides of the first active part 301. The second source 704 and the second drain 703 are respectively connected to the second active part 302 through the doped regions on both sides of the second active part 302. The third source 706 and the third drain 705 are respectively connected to the third active part 303 through the doped regions on both sides of the third active part 303. The fourth source 708 and the fourth drain 707 are respectively connected to the fourth active part 304 through the doped regions on both sides of the fourth active part 304. The fifth source 710 and the fifth drain 709 are respectively connected to the fifth active part 305 through the doped regions on both sides of the fifth active part 305. The sixth source 712 and the sixth drain 711 are respectively connected to the sixth active part 306 through the doped regions on both sides of the third active part 303. The seventh source 714 and the sixth drain 713 are respectively connected to the seventh active part 307 through the doped regions on both sides of the seventh active part 307. This display panel does not have a dielectric layer 6, but directly provides a protective layer 10 on the side of the first source-drain layer away from the base substrate 1.

It can be understood that in the first to third display panels, the spacing between the edge of the orthographic projection of the filter layer on the base substrate 1 and the edge of the orthographic projection of the active layer of the sensing transistor of the first sensing unit 101 on the base substrate 1 may be greater than 3 μm. That is, the spacing between the edge of the orthographic projection of the filter layer on the base substrate 1 and the first active part 301 may be greater than 3 μm. Thus, the light filtering effect is ensured. The spacing between the edges of the orthographic projection of the light shielding part on the base substrate 1 and the orthographic projection of the sensing transistor on the base substrate 1 may be greater than 3 μm to ensure the light shielding effect.

In the above five display panels, the length of the channel region of the sensing transistor along the first direction is greater than the length of the channel region of the sensing transistor along the second direction, and the first direction and the second direction are perpendicular to each other. The first direction is the width direction of the sensing transistor, and the second direction is the length direction of the sensing transistor. The signal volume of the photosensitive signal is the product of the responsivity and the light-receiving area. Reducing the length of the channel region will reduce the light-receiving area, but will increase the responsivity, and the overall signal volume will remain unchanged. By contrast, increasing the width of the channel region will increase the light-receiving area, while keeping the responsivity unchanged, and actually increasing the signal volume.

The greater the length of the channel region of the sensing transistor along the first direction, the greater the signal volume. The overall change is linear, and there is no inflection point. The length of the channel region of the sensing transistor along the second direction only affects the area occupied by the sensing transistor. The photo responsiveness of the sensing transistor is improved by increasing the width-to-length ratio. Specifically, the ratio of the length of the channel region of the sensing transistor along the first direction to the length of the channel region of the sensing transistor along the second direction is greater than 2. For example, widths of the first sensing transistor 1011, the second sensing transistor 1021, and the third sensing transistor 1031 are greater than 10 μm, and lengths thereof are less than 5 μm.

Considering the incident angle of ambient light, the distance between two adjacent sensing units is greater than 6 μm, as well as the distance between adjacent sensing transistors in each sensing unit, and the distance between the sensing transistor and the switch transistor being adjacent to each other are greater than 6 μm. The spacing being greater than 6 μm helps to avoid the influence on the adjacent sensing unit of the filter layer on the sensing transistor of the first sensing unit, and the influence on the adjacent sensing unit of the light shielding part or light blocking part of the switch transistor of one sensing unit.

An embodiment of the present disclosure provides a display apparatus. The display apparatus includes any of the above display panels of the present disclosure. The structure of the display panel has been described in detail above, and therefore will not be described again here. The beneficial effects of the display apparatus can also be referred to the beneficial effects of the display panel.

The display apparatus may be used in traditional electronic devices, such as mobile phones, computers, televisions, and camcorders, or used in emerging wearable devices, such as virtual reality devices and augmented reality devices, which are not listed here.

It should be noted that in addition to the display panel, the display apparatus also includes other necessary components and parts. Taking the display apparatus as an example, it may also include such as a casing, a circuit board, a power cord, etc. Those skilled in the art can make supplements accordingly according to the specific usage requirements and will not be repeated here.

Other embodiments of the present disclosure will be readily apparent to those skilled in the art from consideration of the specification and practice of the content disclosed herein. This application is intended to cover any variations, uses, or adaptations of the present disclosure that follow the general principles of the present disclosure and include common knowledge or customary technical means in the technical field that are not disclosed in the present disclosure. It is intended that the specification and examples be considered as exemplary only, with the true scope and spirit of the present disclosure being indicated by the following claims.

The invention claimed is:

1. A display panel, comprising a display area and a peripheral area outside the display area, wherein the display panel further comprises:
   a base substrate; and
   a sensing module, provided on one side of the base substrate and located in the peripheral area, wherein the sensing module comprises a sensing unit, and the sensing unit comprises:
   a sensing transistor, wherein a first terminal of the sensing transistor receives an electrical signal, a control terminal of the sensing transistor receives a first control signal, and the sensing transistor is used to receive ambient light and convert the ambient light into an electrical signal to be output from a second terminal of the sensing transistor, wherein
   the sensing module has a plurality of sensing units, the sensing transistors of the plurality of sensing units are top-gate polysilicon transistors with transparent gates or bottom-gate polysilicon transistors; and
   the display panel further comprises:

a color filter layer, provided on a side of the sensing module away from the base substrate, wherein the color filter layer comprises a plurality of filter parts of different colors, each filter part corresponds to one of the sensing transistors, and an orthographic projection of a channel region of the sensing transistor on the base substrate is located within an orthographic projection of the filter part on the base substrate.

2. The display panel according to claim 1, wherein the sensing unit further comprises:
   a storage capacitor, wherein a first terminal of the storage capacitor is connected to the second terminal of the sensing transistor, a second terminal of the storage capacitor is connected to ground, and the storage capacitor stores a photosensitive signal output by a second terminal of a sensing transistor; and
   a switch transistor, wherein a first terminal of the switch transistor is connected to the first terminal of the storage capacitor, and a control terminal of the switch transistor receives a second control signal for acquiring the photosensitive signal stored in the storage capacitor.

3. The display panel according to claim 2, wherein
   the sensing module comprises a plurality of sensing units, the first terminals of the sensing transistors of the plurality of sensing units receive electrical signals, and the control terminals of the sensing transistors of the plurality of sensing units sequentially receive the first control signal, and
   the control terminals of the switch transistors of the plurality of sensing units sequentially receive the second control signal for sequentially acquiring the photosensitivity signals stored in the plurality of storage capacitors.

4. The display panel according to claim 3, wherein
   the sensing module comprises a first sensing unit and a second sensing unit, and
   the sensing transistor of the first sensing unit and the sensing transistor of the second sensing unit are top-gate polysilicon transistors with transparent gates.

5. The display panel according to claim 4, wherein the sensing module further comprises a third sensing unit, and a sensing transistor of the third sensing unit is a bottom-gate metal oxide transistor.

6. The display panel according to claim 4, wherein
   a distance between two adjacent sensing units is greater than 6 μm; and
   a distance between the sensing transistor and the switch transistor being adjacent in each sensing unit is greater than 6 μm.

7. The display panel according to claim 2, wherein the switch transistor is a top-gate transistor with a transparent gate or a bottom-gate transistor, and the display panel further comprises:
   a light shielding part, provided on a side of the switch transistor away from the base substrate, wherein an orthographic projection of a channel region of the switch transistor on the base substrate is located within an orthographic projection of the light shielding part on the base substrate.

8. The display panel according to claim 7, wherein a distance between an edge of the orthographic projection of the light shielding part on the base substrate and an edge of the orthographic projection of the channel region of the switch transistor on the base substrate is greater than 3 μm.

9. The display panel according to claim 2, wherein the switch transistor is a top-gate transistor with an opaque gate, and an orthographic projection of a channel region of the switch transistor on the base substrate is located within an orthographic projection of the gate on the base substrate.

10. The display panel according to claim 2, wherein the switch transistor is an oxide transistor or a polysilicon transistor.

11. The display panel according to claim 1, wherein the color filter layer comprises:
    a light shielding part, wherein an orthographic projection of a channel region of the switch transistor on the base substrate is located within an orthographic projection of the light shielding part on the base substrate.

12. The display panel according to claim 2, wherein
    a length of a channel region of the sensing transistor along a first direction is greater than a length of the channel region of the sensing transistor along a second direction, wherein the first direction and the second direction are perpendicular to each other, the first direction is a width direction of the sensing transistor, and the second direction is a length direction of the sensing transistor.

13. The display panel according to claim 1, wherein the sensing module is provided in plural, and the plurality of sensing modules is evenly arranged in the peripheral area along an outline of the display panel.

14. A display apparatus, comprising a display panel, wherein
    the display panel comprises a display area and a peripheral area outside the display area, and the display panel further comprises:
    a base substrate; and
    a sensing module, provided on one side of the base substrate and located in the peripheral area, wherein the sensing module comprises a sensing unit, and the sensing unit comprises:
    a sensing transistor, wherein a first terminal of the sensing transistor receives an electrical signal, a control terminal of the sensing transistor receives a first control signal, and the sensing transistor is used to receive ambient light and convert the ambient light into an electrical signal to be output from a second terminal of the sensing transistor, wherein
    the sensing module has a plurality of sensing units, the sensing transistors of the plurality of sensing units are top-gate polysilicon transistors with transparent gates or bottom-gate polysilicon transistors; and
    the display panel further comprises:
    a color filter layer, provided on a side of the sensing module away from the base substrate, wherein the color filter layer comprises a plurality of filter parts of different colors, each filter part corresponds to one of the sensing transistors, and an orthographic projection of a channel region of the sensing transistor on the base substrate is located within an orthographic projection of the filter part on the base substrate.

15. The display apparatus according to claim 14, wherein the sensing unit further comprises:
    a storage capacitor, wherein a first terminal of the storage capacitor is connected to the second terminal of the sensing transistor, a second terminal of the storage capacitor is connected to ground, and the storage capacitor stores a photosensitive signal output by a second terminal of a sensing transistor; and
    a switch transistor, wherein a first terminal of the switch transistor is connected to the first terminal of the storage capacitor, and a control terminal of the switch transistor receives a second control signal for acquiring the photosensitive signal stored in the storage capacitor.

16. The display apparatus according to claim 14, wherein the sensing module is provided in plural, and the plurality of sensing modules is evenly arranged in the peripheral area along an outline of the display panel.

17. A display panel, comprising a display area and a peripheral area outside the display area, wherein the display panel further comprises:
- a base substrate; and
- a sensing module, provided on one side of the base substrate and located in the peripheral area, wherein the sensing module comprises a sensing unit, and the sensing unit comprises:
- a sensing transistor, wherein a first terminal of the sensing transistor receives an electrical signal, a control terminal of the sensing transistor receives a first control signal, and the sensing transistor is used to receive ambient light and convert the ambient light into an electrical signal to be output from a second terminal of the sensing transistor, wherein the sensing unit further comprises:
- a storage capacitor, wherein a first terminal of the storage capacitor is connected to the second terminal of the sensing transistor, a second terminal of the storage capacitor is connected to ground, and the storage capacitor stores a photosensitive signal output by a second terminal of a sensing transistor; and
- a switch transistor, wherein a first terminal of the switch transistor is connected to the first terminal of the storage capacitor, and a control terminal of the switch transistor receives a second control signal for acquiring the photosensitive signal stored in the storage capacitor, wherein the sensing module comprises a plurality of sensing units, the first terminals of the sensing transistors of the plurality of sensing units receive electrical signals, and the control terminals of the sensing transistors of the plurality of sensing units sequentially receive the first control signal, and the control terminals of the switch transistors of the plurality of sensing units sequentially receive the second control signal for sequentially acquiring the photosensitivity signals stored in the plurality of storage capacitors, wherein the sensing module comprises a first sensing unit and a second sensing unit, and the sensing transistor of the first sensing unit and the sensing transistor of the second sensing unit are top-gate polysilicon transistors with transparent gates, wherein a filter layer is provided on a side of the first sensing unit away from the base substrate, an orthographic projection of a channel region of the sensing transistor of the first sensing unit on the base substrate is located within an orthographic projection of the filter layer on the base substrate, and the filter layer is used to transmit monochromatic light.

18. The display panel according to claim 17, wherein a distance between an edge of the orthographic projection of the filter layer on the base substrate and an edge of the orthographic projection of the channel region of the sensing transistor of the first sensing unit on the base substrate is greater than 3 µm.

* * * * *